US 8,201,581 B2

(12) United States Patent
George

(10) Patent No.: US 8,201,581 B2
(45) Date of Patent: Jun. 19, 2012

(54) WASTE WATER OUTLET

(76) Inventor: Robert George, Kent (GB)

( * ) Notice: Subject to any disclaimer, the term of this patent is extended or adjusted under 35 U.S.C. 154(b) by 789 days.

(21) Appl. No.: 12/088,409

(22) PCT Filed: Aug. 22, 2006

(86) PCT No.: PCT/GB2006/003134
§ 371 (c)(1),
(2), (4) Date: Mar. 27, 2008

(87) PCT Pub. No.: WO2007/036685
PCT Pub. Date: Apr. 5, 2007

(65) Prior Publication Data
US 2010/0180966 A1      Jul. 22, 2010

(30) Foreign Application Priority Data

Sep. 27, 2005 (GB) .................................. 0519702.5

(51) Int. Cl.
*F16K 11/085* (2006.01)
(52) U.S. Cl. .................................. 137/876; 4/688; 4/693
(58) Field of Classification Search .................. 137/876; 4/665, 688, 689, 693
See application file for complete search history.

(56) References Cited

U.S. PATENT DOCUMENTS 2,651,051 A * 9/1953 Parks et al. ............... 137/625.44
5,092,003 A * 3/1992 Weinberg .......................... 4/693
5,274,861 A * 1/1994 Ford .................................. 4/665
5,313,677 A * 5/1994 Coe ................................... 4/683
5,323,810 A * 6/1994 Cantatore ................ 137/599.16
5,465,434 A * 11/1995 Coe .................................. 4/546

FOREIGN PATENT DOCUMENTS

| CN | 1228133 A | 8/1999 |
| DE | 9114868 U1 | 1/1992 |
| DE | 19613631 A1 | 10/1997 |
| DE | 29710593 U1 | 6/1998 |
| DE | 19741827 A1 | 3/1999 |
| FR | 2830552 A | 10/2001 |
| JP | 2002-106060 U | 8/1990 |
| JP | 2002-275957 | 9/2002 |
| WO | WO97/49874 | 12/1997 |

OTHER PUBLICATIONS

International Search Report, PCT/GB2006/003134, Nov. 10, 2006.

(Continued)

*Primary Examiner* — John Fox
(74) *Attorney, Agent, or Firm* — Carmody & Torrance LLP

(57) ABSTRACT

The present invention provides a waste for an item of sanitary ware generating grey water, the waste comprising: (i) an inlet for admitting grey water; (ii) first and second outlets configured to discharge grey water, the first outlet being arranged to connect to a drainage system, and the second outlet being arranged to connect to a recycling system; (iii) a valve configured to selectively direct water to the first outlet or the second outlet, the valve being located between the inlet and the first and the second outlets, wherein the valve is operable between the first and the second positions, the valve connecting the inlet to the first outlet in the first position and the valve connecting the inlet to the second outlet in the second position; and (iv) a plug dimensioned to fit the inlet and configured to operate the valve by manipulation of the plug.

6 Claims, 6 Drawing Sheets

OTHER PUBLICATIONS

Patents Act 1977: Search Report Under Section 17, Received from "The Patent Office" (UK), GB0519702.5, Jan. 27, 2006.
English Translation of Japanese Office Action, Patent Application No. JP-2008-532850, dated Jul. 27, 2010.
Japanese Office Action, Patent Application No. JP-2008-532850, dated Jul. 27, 2010.
English Translation of the First Office Action for Application No. 2006/00346465.

* cited by examiner

WASTE WATER OUTLET

CROSS REFERENCE TO RELATED APPLICATIONS

This application claims priority under 35 U.S.C. §371 to PCT/GB2006/003134 filed on Aug. 22, 2006, which claims priority to United Kingdom Application No. 0519702.5 filed on Sep. 27, 2005, the entire contents of each of which are incorporated herein by reference.

TECHNICAL FIELD

The invention relates to a waste for sanitary ware generating grey water, and an item of sanitary ware generating grey water having a waste. In this context, a waste is a fitting to the outlet of an item of sanitary ware; and an item of sanitary ware includes, without limitation, a bath, basin or sink.

BACKGROUND OF THE INVENTION, AND PRIOR ART

There is an increasing need to reduce domestic demand for potable water, and at the same time to reduce the volume of waste discharged to sewers. Domestic use of potable water generates a substantial quantity of grey water from sanitary ware that includes baths, basins and sinks. Grey water can be recycled and used for other purposes where potable water is not necessary, for example in watering a garden, and in flushing a toilet and in appropriate cycles of clothes and dish washing machines.

A known way of collecting grey water is to direct all the water generated by sanitary ware to a storage tank. For example, the grey water is collected in an external water butt with an over-flow to a drain and an outlet to a garden hose; or the water can be collected in a buried, or a raised, tank, both of which require the use of a pump. In a buried tank the pump would move the water out of the tank when the water is needed; and in a raised tank the pump would transfer the water into the tank for storage.

These systems collect grey water containing various quantities of pollutant. Consequently, the storage tank will collect polluting refuse, and there is a risk of noxious substances being delivered with the grey water. To generate usable grey water the system is fitted with a filter and/or a water treatment unit to clean the water. Furthermore, this type of system is not cost effective to install in a new building or to fit to sanitary ware in existing buildings.

Another known device is used to collect grey water generated by a number of household water appliances. The grey water produced by each appliance has a different concentration of pollutant. The water is directed by a valve in the device to a drainage system or to a recycling system. Therefore, the recycled grey water produced by different appliances is mixed together by the device, limiting the application of the grey water to uses where a certain concentration of pollutant is acceptable. Also, to fit the device to an existing plumbing system, the system needs a considerable amount of alteration because the device is connected to the drainage system at its outflow from the household. Normally the grey water would be directed immediately to a foul water drainage system.

As mentioned, with such prior art grey water systems it is known to provide a valve within the drainage system, which is able to switch water drained from an appliance or item of sanitary ware into either the grey water storage tank, or directly into the drainage system. An example of such a prior art valve is that shown in U.S. Pat. No. 5,313,677. Here, a valve is provided with a first inlet for accepting water from the drain of a bath tub, a second inlet for accepting water from the overflow drain of a bathtub, a first outlet leading to the sewer line, and a second outlet leading to the grey water storage tank. The valve operates to block either the first inlet, the first outlet, or the second outlet only, and all other parts remain open. The valve is arranged to be built into the pipes of the plumbing system leading from the appliance, and a complicated lever system is provided to allow remote operation of the valve. The installation of such a valve requires much modification of the existing plumbing system within a house, requiring access to pipes which may be hidden within walls and the like.

A similar example is shown in FR 2830552. Again, this document describes a valve provided in the outlet pipe from an item of sanitary ware such as a water basin or sink. Again, to install such a valve the plumbing system at the house must be modified, and a complicated pulley system is employed to allow remote operation of the valve by a user standing at or within the item of sanitary ware. With both of these prior art documents, therefore, the remote location of the valves within the plumbing system, rather than at the item of sanitary ware, leads to increased complexity.

It is, however, known to provide switching between directing grey water to a grey water recycling system or the drain, without requiring modification of the plumbing system itself and remote manipulation of any such installed valve. In particular, DE 19613631 A describes a waste for an item of sanitary ware, which appears to provide for switching between supplying the grey water to the drainage system, or a recycling system. However, such a waste is intended for use with a shower, and does not, therefore, also provide for blocking of the outlet, as would be required by a waste for use in a bath or a sink.

SUMMARY OF THE INVENTION

The present invention addresses the above described shortcomings of the prior art by providing a waste for an item of sanitary ware generating grey water, which allows for the selective direction of grey water produced by the item of sanitary ware to a drainage system, or to a grey water recycling system. Additionally, however, to make the waste suitable for use, for example, with a bath or sink unit, the waste is also arranged to provide a plug function in terms of blocking the outlet from the item of sanitary ware, in order that the item may be filled with water. The provision of a waste having both functions of being able to selectively direct the grey water to a recycling system, and also providing a plug function for the item of sanitary ware, has advantages in that no extensive modification of the existing plumbing system need be performed, and as both switching and plugging functions are provided by the waste, which is located at the item of sanitary ware, no complicated remote operating arrangement need be provided.

In a first aspect of the invention there is provided a waste for an item of sanitary ware generating grey water, the waste comprising:
  (i) an inlet configured to admit grey water;
  (ii) first and second outlets configured to discharge grey water, the first outlet being arranged to connect to a drainage system, and the second outlet being arranged to connect to a recycling system;
  (iii) a valve configured to selectively direct water to the first outlet or the second outlet, wherein the valve is operable between first and second positions, the valve connecting the inlet to the first outlet in the first position and the valve connecting the inlet to the second outlet in the second position; and (iv) the valve further comprising a plug element dimensioned to fit the inlet and configured to operate the valve by manipulation of the plug element.

Advantageously, the waste can be directly fitted to an item of sanitary ware generating grey water, so that it is an integral part of the sanitary ware. Having a valve in the waste appliance facilitates the operation of the valve at the appliance by the user every time the appliance is used. The water can be directed to the recycling system for reuse if the water has sufficiently few pollutants; alternatively, the water is directed to the drainage system if the water contains too many pollutants for reuse.

The valve may have a third position in which both outlets are closed. Advantageously the waste has an integrated valve that prevents the outflow of water.

Advantageously the means to operate the valve is located at the waste, and is therefore easy to install.

The valve can have a sleeve that is arranged to be rotatable between each of the positions. In another arrangement the valve might be operable by raising or lowering the sleeve in the valve.

The sleeve might have first and second ports, the first port being arranged to align with the first outlet in the first position, and the second port being arranged to align with the second outlet in the second position.

The valve may comprise a housing that contains the sleeve, and the sleeve may be arranged to displace along the length of the housing on rotation of the sleeve.

The waste may further comprise flanges, the flanges being arranged to secure the waste to a rim of an aperture of an item of sanitary ware. The flanges may comprise an inner flange and an outer flange that are located either side of the rim. Advantageously, this arrangement creates a water tight seal between the waste and the sanitary ware to which it is affixed. The housing may comprise a further sleeve that is fixed to the housing, and in which the first sleeve rotates. The outer flange may comprise part of the further sleeve. The outer flange secures to the underside of the rim of the aperture, and comprises part of the housing. The further sleeve can be secured to the housing, preferably by a screw.

The waste may further comprise a tactile means arranged to identify each of the positions. Advantageously, a user can identify each position of the valve. The tactile means is preferably sprung dimples and corresponding notches located between the two sleeves.

The second outlet can be double ended. This facilitates the connection of the waste to a recycling system, because only one of the second outlet has to be connected to the recycling system.

The first outlet may comprise an integral trap. Advantageously, the waste can be fitted direct to the drainage system, without fitting a standard trap to the waste.

The first outlet can further comprise means for connecting to an over-flow. Advantageously, the waste has a spigot that can be connected directly to an over-flow pipe.

In a second aspect of the invention there is provided an item of sanitary ware generating grey water having a vessel for holding water and a waste for releasing the water from the vessel, the waste comprising:

(i) an inlet for the entry of grey water, the inlet being located in the vessel and being arranged in use to receive water from the vessel under the influence of gravity;

(ii) first and second outlets configured to discharge grey water from the vessel, the first outlet being arranged to connect to a drainage system, and the second outlet being arranged to connect to a recycling system;

(iii) a valve configured to selectively direct water from the inlet to the first outlet or the second outlet, wherein the valve is operable between a first position and a second position, the valve connecting the inlet to the first outlet in the first position, and the valve connecting the inlet to the second outlet in the second position; and (iv) the valve comprising a plug element dimensioned to fit the inlet and configured to operate the valve by manipulation of the plug element.

Advantageously, the waste allows grey water generated by the sanitary ware appliance to be stored within the appliance should the grey water not be immediately required for a recycling purpose.

A third aspect of the invention provides a waste for an item of sanitary ware, the waste comprising:

a first outlet configured to discharge water to a drainage system a second outlet configured to discharge water to a recycling system;

and a waste control element, arranged to selectively provide one of three operating modes for the waste:

i) to permit discharge of water from the first outlet;
ii) to permit discharge of water from the second outlet; or
iii) to prevent discharge of water from the waste; the waste control element being directly manually operable by a user.

A number of other preferable features and aspects are referred to in the dependent claims.

BRIEF DESCRIPTION OF THE DRAWINGS

Embodiments of a waste constructed in accordance with the invention, and an item of sanitary ware generating grey water having such a waste, will now be described, by way of example only, with reference to the drawings, in which.

DESCRIPTION OF THE EMBODIMENTS

Figure 1:
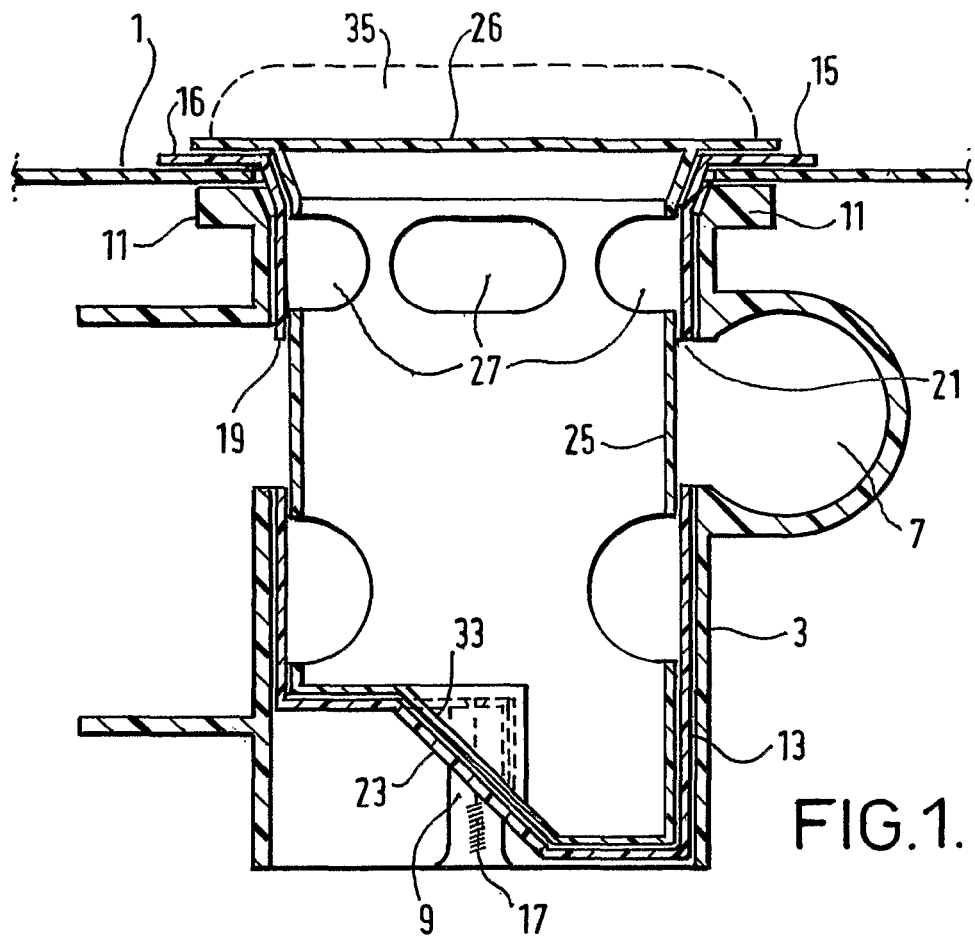
FIG. 1 is a longitudinal cross-section of a waste according to a first embodiment having a valve in a closed position.
Figure 2:
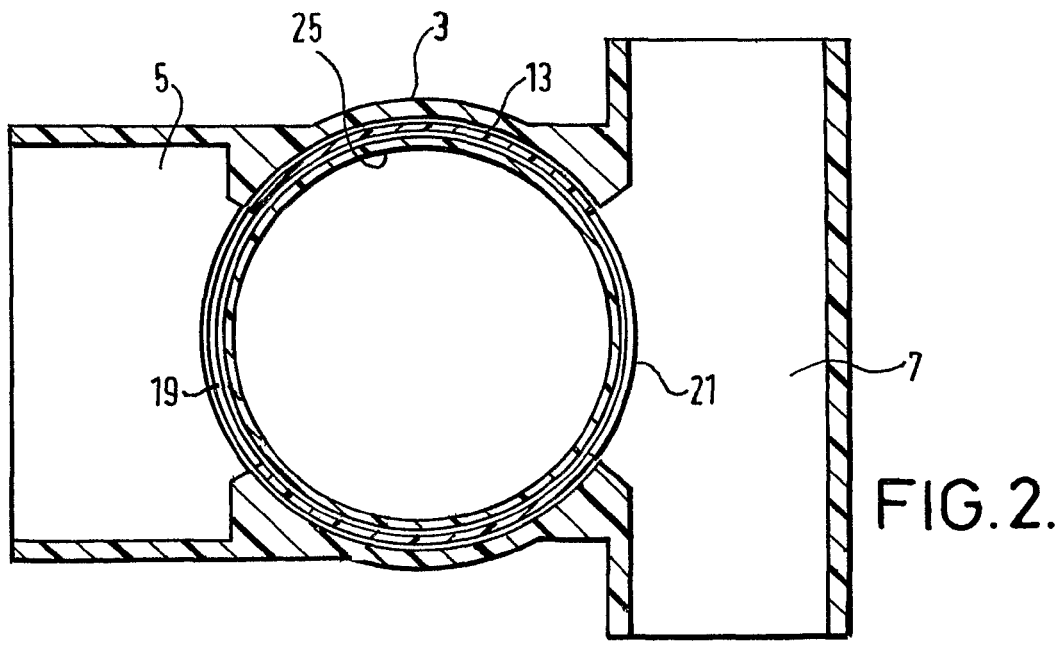
FIG. 2 is a lateral cross-section of the waste with the valve closed.

Referring to the drawings, FIGS. 1 and 2 show a waste according to a first embodiment fitted to an outlet 1 of a waste water appliance. The waste comprises a housing 3 having a drain outlet 5 for connection to a drainage system, a recycle outlet 7 for connection to a recycling system and accommodation for an outer sleeve 13. The outer sleeve 13 is fixed to the housing 3 and is substantially cylindrical. An inner sleeve 25 is provided within the outer sleeve 13. FIG. 2 shows the relative positions of the drain outlet 5, the recycle outlet 7 and the inner and outer sleeves 13 and 25.

The outer sleeve 13 is a close fit with the inner sleeve 25, and the two sleeves are of complementary shape, the inner sleeve 25 being manually rotatable within the outer sleeve 13. As shown in FIGS. 3 to 6, the inner sleeve 25 has a number of ports which overlap with apertures in the housing and the outer sleeve 13 to direct water in the appliance to the drain outlet 5 or the recycle outlet 7, or to prevent the water passing through the waste. The arrangement of the housing 3, the inner sleeve 25 and the outer sleeve 13 operate as a valve.

The housing 3 further comprises a fixing boss 9 that is located at the base of the outer sleeve 13, and a housing flange 11 for securing to the underside of the rim of the outlet 1. The outer sleeve 13 also has a sleeve flange 15 for securing to the upper-side of the rim of the outlet 1. The waste is secured to the rim of the outlet by a screw 17 that passes through the base of the outer sleeve 13 into the fixing boss 9. As the screw 17 is tightened, the flanges are pressed together clamping to either side of the rim. The same screw 17 also secures the outer sleeve 13 to the housing 3.

The housing 3 has apertures that interconnect the accommodation for the sleeves 13 and 25 to the drain outlet 5 and the recycle outlet 7. In the side-wall of the outer sleeve 13 is a drain aperture 19 and a recycle aperture 21. The drain aperture 19 aligns with the aperture in the housing that connects to the drain outlet 5; and the recycle aperture 21 aligns with the aperture that connects to the recycle outlet 7.

The inner sleeve 25 is a close fit within the outer sleeve 13. It has a lid 26 which serves as a plug. A hand-grip 35 is provided on the top of the lid, the hand-grip being usable to operate the waste manually. The side-wall of the inner sleeve 25 has a drain port 29, a recycle port 31, and a plurality of inlet ports 27. The inner sleeve 25 has tapered shoulders 34, which correspond in shape to a tapered rim 16 of the outer sleeve 13. The base of the inner sleeve 25 has an inclined component 33. The outer sleeve 13 has a corresponding inclined component 23. When the inner sleeve 25 is rotated within the outer sleeve 13, the two inclined components 23 and 33 interact, causing the inner sleeve to rise within the outer sleeve.

As shown in FIG. 1 the lid 26 lies against the surface of the sleeve flange 15, and the inlet ports 27 lie below the rim of the outlet 1, so that any water contained within the appliance cannot pass into the waste. Indeed, the pressure of the water on the lid would maintain a water-tight seal formed between the surfaces of the lid 26 and the sleeve flange 15. The tapered rim 14 and the tapered shoulders 24 increase the effectiveness of the seal. If water were to pass into the inner sleeve 25, it could not pass through to either the drain outlet 5 or the recycle outlet 7 because neither of the two ports 29 and 31 are aligned with either the drain aperture 19 or the recycle aperture 21.

Figure 3:
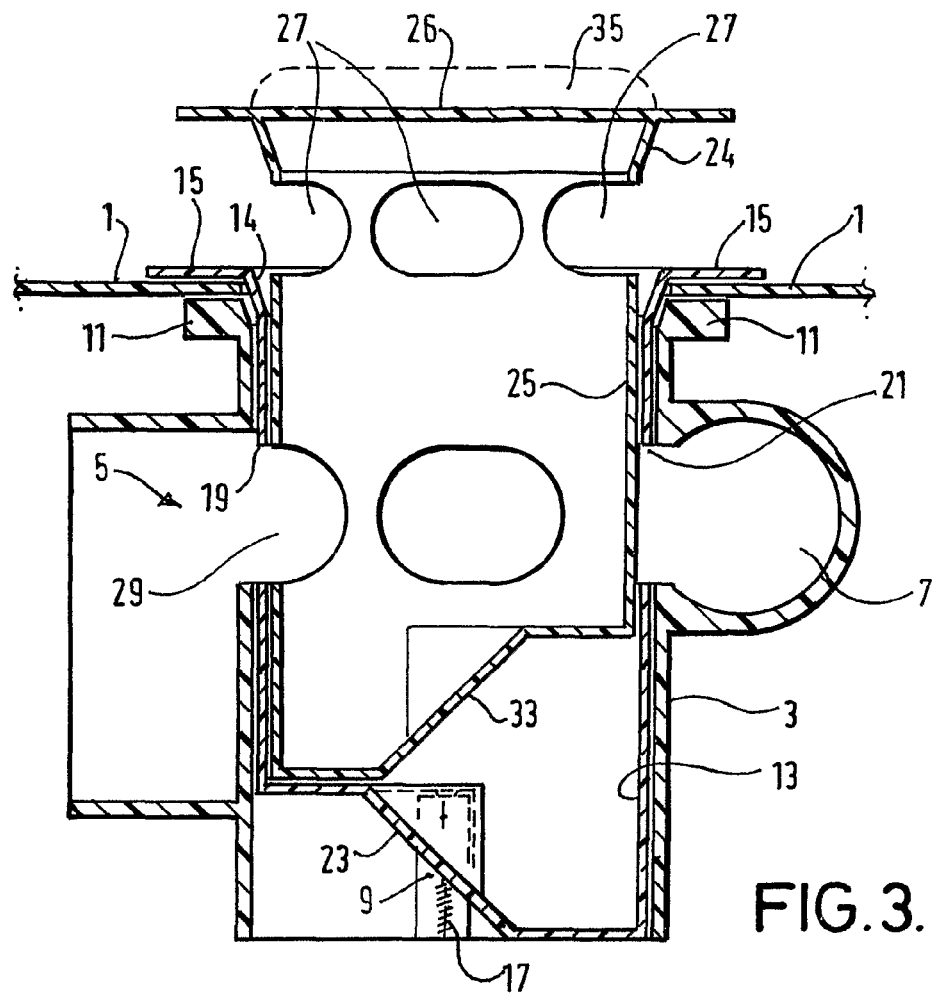
FIG. 3 is a longitudinal cross-section of the waste with the valve open to the drainage system.
Figure 4:
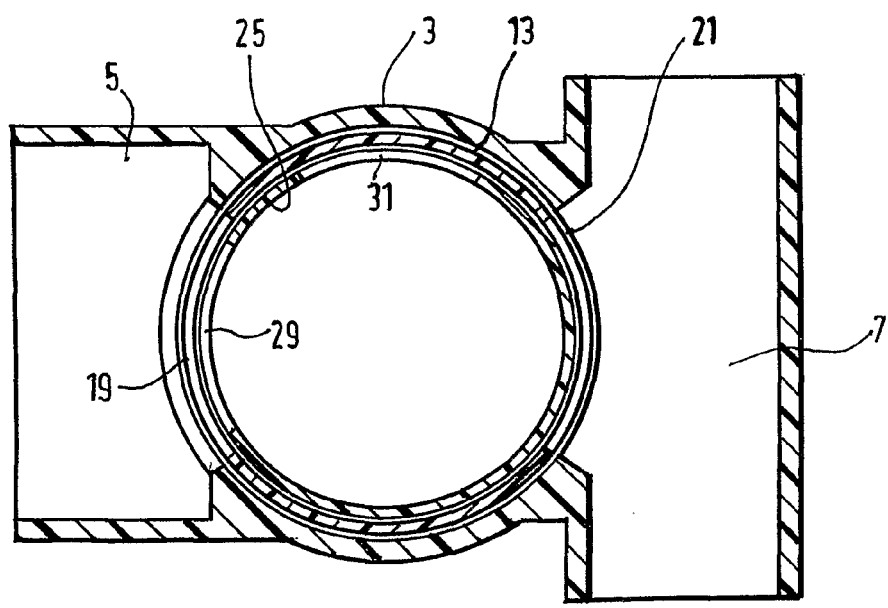
FIG. 4 is a lateral cross-section of the waste with the valve open to the drainage system.

In FIG. 3, the inner sleeve 25 has been rotated into a first position to open the waste to the drain outlet 5. In this position, the interaction between the inclined components 23 and 33 of the outer sleeve 25 and the inner sleeve 13 has raised the inner sleeve. The lid 26 has separated from the sleeve flange 15, the inlet ports 27 now lie above the rim of the outlet 1, and the drain port 29 is aligned with the drain aperture 19. Water in the appliance can now pass through the inlet ports 27 into the inner sleeve 25. The water can then pass from the inner sleeve 25 into the drain outlet 5. FIG. 4 shows the arrangement of the drain port 29 and the drain outlet 19.

Figure 5:
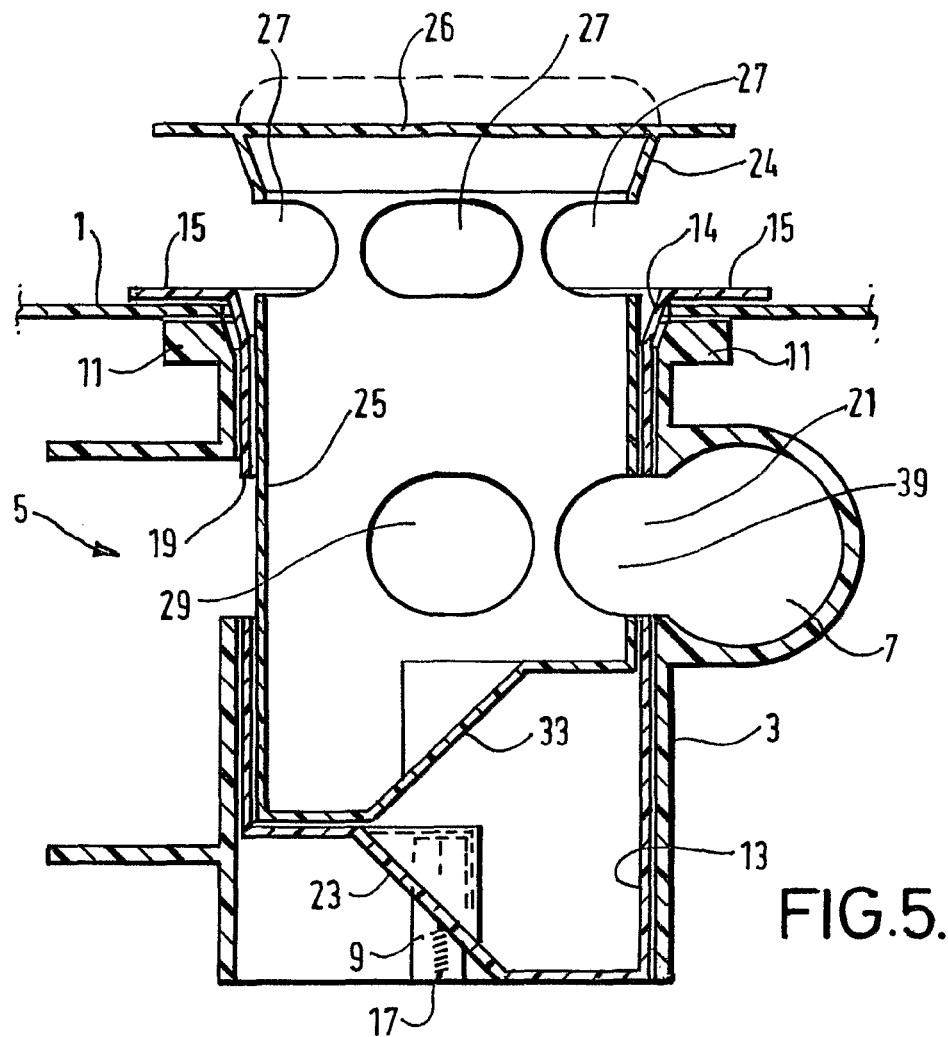
FIG. 5 is a longitudinal cross-section of the waste with the valve open to the recycling system.
Figure 6:
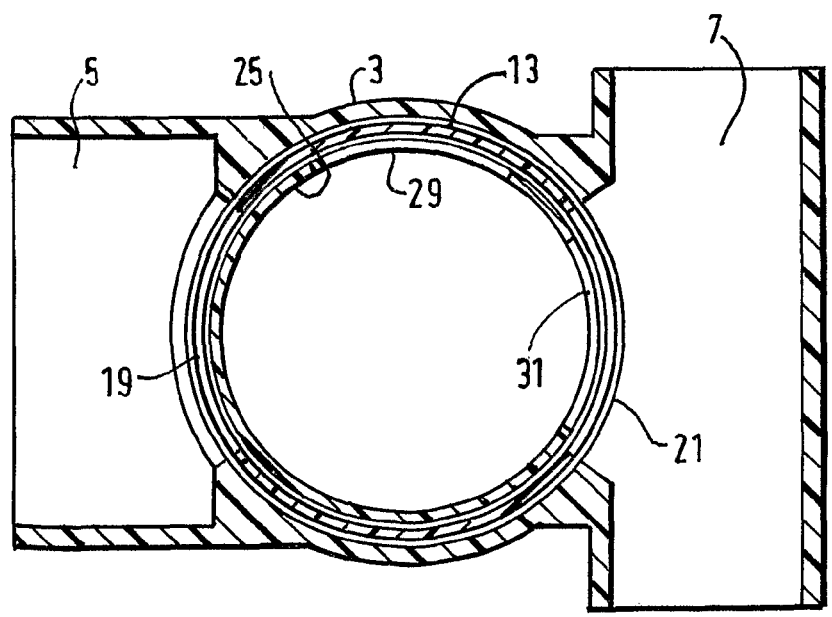
FIG. 6 is a lateral cross-section of the waste with the valve open to the recycling system.

In the position shown in FIG. 5, the inner sleeve 25 has been rotated into a second position to open the waste to the recycle outlet 7. In this position, the interaction between the inclined components 23 and 33 of the outer sleeve 25 and the inner sleeve 13 has raised the inner sleeve. The lid 26 has separated from the sleeve flange 15, the inlet ports 27 now lie above the rim of the outlet 1, and the recycle port 31 is aligned with the recycle aperture 21. Water in the appliance can now pass through the inlet ports 27 into the inner sleeve 25. The water then passes from the inner sleeve 25 into the recycle outlet 7. FIG. 6 shows the arrangement of the recycle port 31 and the recycle inlet 21.

By operation of the waste, a user can direct waste water to a drainage system, or to a recycling system. The waste is arranged so that a user can operate the valve to open it either to the drainage system or to the recycling system. When the valve is open, a user can operate the waste to move to the other open position, or to close the valve.

The recycling system can be designed to reuse the water when directing the water to the recycling system. If the water is suitable for recycling, but is not yet required, the water can be left in the appliance until it is required. Thus, the waste converts the appliance into a short-term storage means.

The waste can be fitted to an existing appliance. First, if the appliance has an existing waste, it is removed. The drain outlet 5 is then fitted to the existing drainage system, and one end of the recycle outlet 7 is connected to a recycling system. The other end of the recycle outlet 7 is closed off. (In another embodiment, the recycle outlet 7 has only one end). The housing flanges 11 are aligned with the rim of the outlet 1, and the outer sleeve 13 is passed through the outlet. By securing the outer sleeve 25 to the boss 9, the housing flange 11 and the sleeve flange 15 secure the waste to the appliance. Before the outer sleeve 25 is fully secured to the housing 3, it is ensured that the drain outlet 19 and the recycle outlet 21 are aligned with the apertures that interconnect the accommodation for the outer sleeve 13 with the drain outlet 5 and the recycle outlet 7. The inner sleeve 25 is then inserted into the outer sleeve 13.

Figure 7:
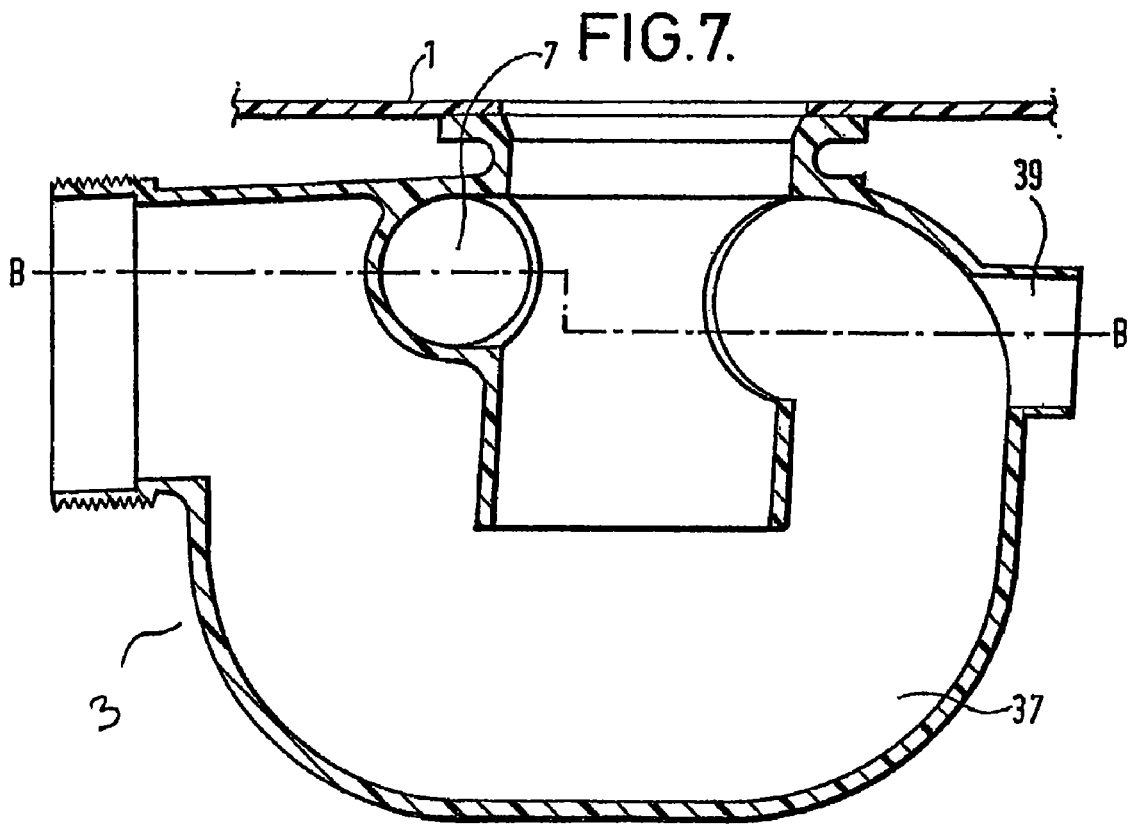
FIG. 7 is a longitudinal cross-section of a housing for a waste, the housing having an integral trap and an over-flow connection.
Figure 8:
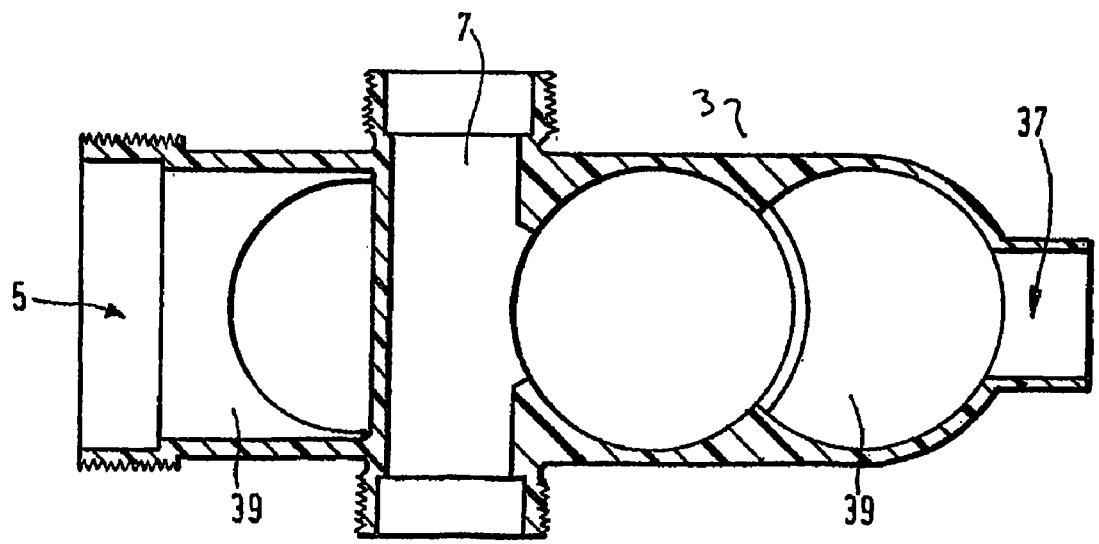
FIG. 8 is a cross-section of the housing shown in FIG. 7 along the line B-B.

FIG. 7 shows a waste housing 3 that has an integral trap 37 connected to the drain outlet 5. A spigot is provided at an end of the trap near the drain outlet 5, the spigot being connected to an over-flow connection 39. FIG. 8 is a lateral cross-section of the same waste along the line B-B shown in FIG. 7. Having the trap pre-fitted to the waste facilitates the fitting of a waste to an existing appliance. Note that only the housing is shown in FIGS. 7 and 8. The same arrangement of inner and outer sleeves 13 and 25, respectively, is used in this embodiment as shown in FIGS. 1 to 6.

Figure 9:
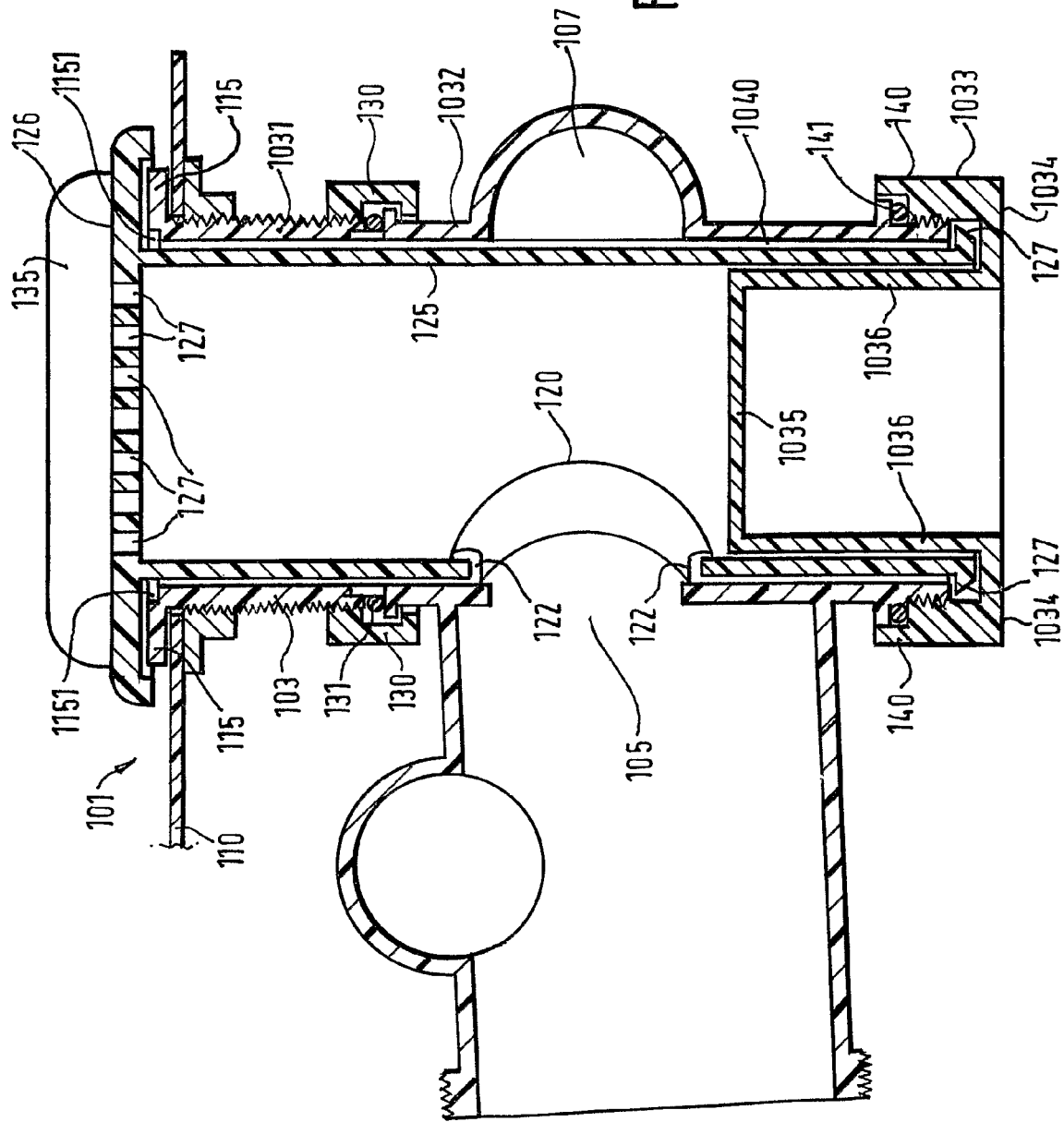
FIG. 9 is a longitudinal cross-section of a waste according to a second embodiment, and having a valve in a position to open to a drainage system.

A second embodiment of the present invention will now be described with respect to FIGS. 9 and 10.

Here, a waste 101 according to the second embodiment comprises outer sleeve 103 which is formed with three parts, an upper part 1031, a middle part 1032, and a lower part 1033. The upper part 1031 of the outer sleeve 103 is provided with a flange 115. The outer sleeve 103 is generally cylindrical in shape, and adapted to fit into a substantially circular hole provided within the base 110 of an item of sanitary ware. The flange 115 provided at the upper end of the sleeve 103 acts to abut against the upper surface of base 110 of the item of sanitary ware, to hold the outer sleeve 103 in place. The upper part 1031 of outer sleeve 103 is attached by means of a clip connection 130 to the middle part 1032. A sealing ring 131 is placed between the upper part 1031 and the middle part 1032. The middle part 1032 of the outer sleeve 103 is provided with a first aperture 107 which leads to a water recycling system. In view of this, the aperture 107 is hereafter termed the recycling aperture. A further aperture 105 is provided at the opposite side of the sleeve 103 to the recycling aperture 107, and which is for connection to the existing drainage system. Thus, the outer sleeve 103 is provided with both the recycling aperture 107, and the drainage aperture 105. Both of these apertures are provided within the middle part 1032 of outer sleeve 103.

The middle part 1032 of the outer sleeve 103 extends substantially to the base of the outer sleeve 103, and is open ended. In order to close the lower open end of the outer sleeve 103, a lower part 1033 is provided, which is arranged to attach to the middle part 1032 via connection 140. Please note that the attachment may be via a screw fit, cementing, gluing, or the like. A sealing ring 141 is provided between the middle part 1032 of the outer sleeve 103, and the lower part 1033.

The lower part 1033 of the outer sleeve 103 is provided with lower surface 1034, which extends inwardly inside the circumference of the outer sleeve 103. On the inner side of lower wall 1034 are provided upstanding walls 1036, which extend inside outer sleeve 103, and which are connected by connecting wall 1035. Connecting wall 135 and upstanding walls 1036 together form in cross section an inverted U shape. The upstanding walls 1036 located inside the circumference of the outer sleeve 103, form, together with the wall of middle section 1032, an annular recess 1040, in the bottom part of sleeve 103, which in use receives the lower section of an inner sleeve 125, to be described below.

Outer sleeve 103 therefore provides suitable connections in the form of flange 115 to allow the waste to be fitted to the item of sanitary ware, and also provides plumbing connections to the existing drainage system, and to the recycling system. However, in order to allow for switching of drainage water from the item of sanitary ware to either the drainage system, or the recycling system, and also to allow the waste to perform a plugging function, inner sleeve 125 is provided, which is substantially cylindrical in shape, and which is concentrically arranged within outer sleeve 103, so as to be rotatable within outer sleeve 103.

More particularly, inner sleeve 125 comprises a substantially cylindrical sleeve, having an aperture 120 formed therein, at a position along sleeve 125 such that when sleeve 125 is inserted in outer sleeve 130 the aperture 120 is at the same height in the arrangement as the apertures 107 and 105 in outer sleeve 103. The walls of inner sleeve 125 extend downwards into the annular recess 1040 formed by the upstanding walls 1036 of lower sleeve portion 1033, and the walls of middle sleeve portion 1032. The lower edge of the wall of inner sleeve 125 is provided with a catch portion 127, which when the sleeve 125 is inserted into the annulus 140 to its fullest extent, then catches on the lower surface of wall 1032 of the middle portion, so as to maintain the inner sleeve 125 in place within the outer sleeve 103.

At the upper end of inner sleeve 125 is provided a lid portion 126, which extends substantially horizontally over the flange 115 of the outer sleeve 113. Within the lid portion 126 are formed a plurality of drainage holes 127, to allow water to flow into the interior of sleeve 125. Additionally provided is a handle 135 attached to lid 126, and which can be gripped by a user to provide rotation of sleeve 125 inside outer sleeve 103.

Sleeve 125 is therefore mounted inside sleeve 103, and is rotatable therein. In order to provide for a seal between sleeve 125 and outer sleeve 103, seal 1151 is provided between lid portion 126 of inner sleeve 125 and flange portion 115 of outer sleeve 103, and seal 122 is provided between inner sleeve 125 and outer sleeve 103 around the aperture 120 in inner sleeve 125.

In operation, the rotatable nature of inner sleeve 125 within outer sleeve 103 allows for the waste to provide three modes of operation, namely drainage of water from the item of sanitary ware to which it is fitted into the conventional drainage system, drainage of water from the item of sanitary ware into the recycling system, and plugging of the outlet in the item of sanitary ware. These three functions are achieved by rotating the inner sleeve 125 such that the aperture 120 lines up with the drainage aperture 105 to drain water into the conventional drainage system, with the aperture 107 to drain water into the recycling system, or with neither aperture 105 or 107 to perform a plugging function. This operation is described further below with reference to FIG. 10.

Figure 10:
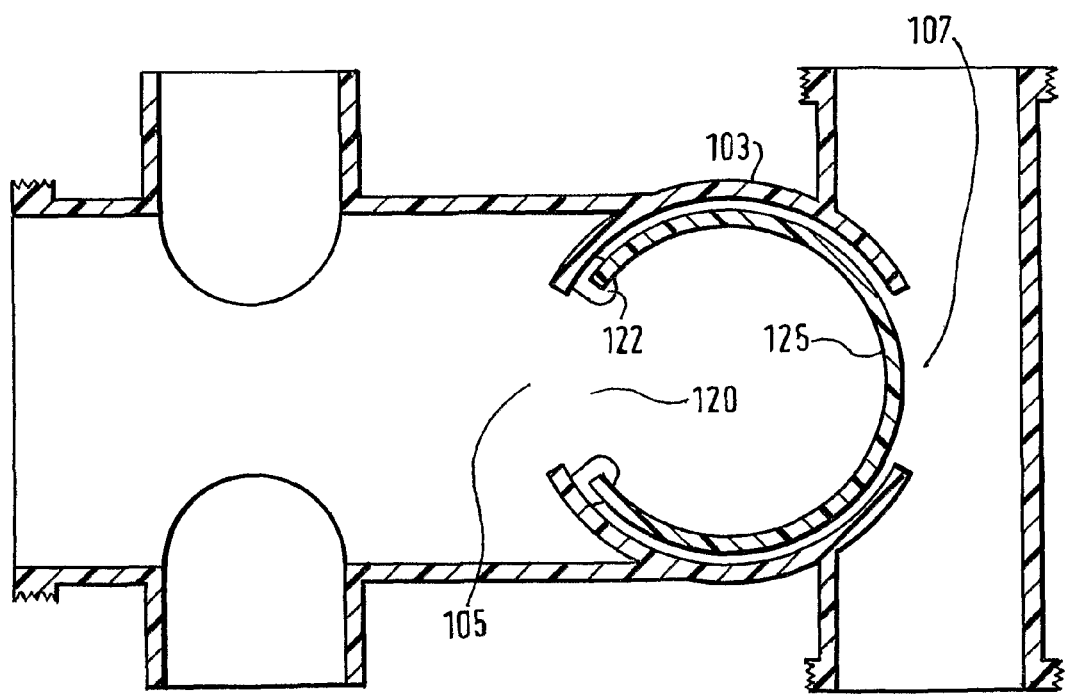
FIG. 10 is a lateral cross-section of the waste of FIG. 9.

More particularly, FIG. 10 is a cross-section through the waste 101 taken at the level of the apertures 105 and 107 in the outer sleeve 103, and the aperture 120 in the inner sleeve 125. FIG. 10 illustrates the inner sleeve 125 oriented such that the aperture 120 is aligned with the drainage aperture 105, and in such a position water within the item of sanitary ware to which the waste is affixed can flow through the drainage holes 127 in the lid portion 126 of the inner sleeve 125, into the interior of the inner sleeve 125, and then out through aperture 120 aligned with aperture 105, into the conventional drainage system. Thus, in the position shown in FIG. 10, water can drain from the item of sanitary ware to the conventional drainage system.

In order to plug the item of sanitary ware, the inner sleeve 125 is rotated, preferably by hand using the handle 135, to a position where the aperture 120 is not aligned, even partially, with the drainage aperture 105, and neither is it aligned even partially, with the recycling aperture 107. Thus, for example, with the specific arrangement shown in the drawings, rotation of the inner sleeve 125 by approximately 90° in either direction will result in the aperture 120 being non-aligned with either aperture 105 or 107. Instead, the aperture 120 would face the inner wall of outer sleeve 103, and due to the seal 122 around aperture 120, water would be prevented from escaping. In this case, once the interior of inner sleeve 125 has filled with water through drainage holes 127, the item of sanitary ware would be effectively plugged, and hence could fill with water. Such operation is clearly required for an item of sanitary ware such as a sink or a bath.

From the plugging position of the inner sleeve 125, the waste can be switched to drain water into the recycling system by rotating the inner sleeve 125 further in the same direction as previously rotated, until the aperture 120 is aligned with the recycling aperture 107. In the specific arrangements shown in the drawings such alignment requires a further rotation of approximately 90°. In this case, the aperture 120 becomes aligned with the recycling aperture 107, and water contained within the item of sanitary ware can flow from the interior of inner sleeve 125 into the recycling system, through recycling aperture 107.

Thus, as in the first embodiment, the second embodiment provides for water to be drained either into an existing drainage system, or into a recycling system, and further provides for plugging of the items of sanitary ware. Such operations are achieved by virtue of a rotation of the inner sleeve. Moreover, these three functions are achieved by a relatively compact and reliable unit, with no complicated remote operating mechanisms, by virtue of the waste incorporating all three functions.

Moreover, the waste 101 of the second embodiment may also be incorporated into the waste housing 3 of FIG. 7, thus providing an integral trap. In this respect, the arrangement of outer sleeve 103 and inner sleeve 125 are used with the housing 3 shown in FIGS. 7 and 8.

Further modifications may be made to any of the above described embodiments, to provide further embodiments, as described below.

Instead of fitting the waste to an appliance, the waste can be pre-fitted to an appliance. Such a pre-fitted waste may have an integral trap and over-flow connection.

The waste can be fitted to an appliance by means other than the flange and screw arrangement described herein. The waste could be cemented or glued to the appliance.

The arrangement for operating the valve need not be that described in the preferred embodiments. Any suitable arrangement could be used, for example the inner sleeve may move only vertically or only horizontally relative to the housing. Also, the inner sleeve could be spring-loaded.

In the first embodiment, the lid 26 serves as a plug element. In another embodiment, the inner sleeve 25 might not have a lid, and a separate plug element would then be used to close the waste. In the second embodiment the plugging function is performed by the inner sleeve in combination with the outer sleeve, which together form a plug element.

In any of the embodiments the lid can have a hand grip 35 or 135 located on its top surface to facilitate the manipulation of the inner sleeve. The waste may also have indicators on the lid to identify the locations of different positions: closed, open to the drainage system and open to the recycling system. The waste can also have tactile means so a user can detect when the valve in the waste is closed or at one of the open positions. For example, there might be a series of dimples and notches, respectively, on the outer surface of the inner sleeve 25 or 125 and the outer sleeve 3 or 103 which inter-engage when the waste is one of the different positions.

In the preferred embodiment, the waste is operable by a user rotating the inner sleeve 25.

Note, the valve can be described as being in a third position when the valve is shut.

Additionally, within the above embodiments we have shown seals to provide water-tight fits between components, where necessary. In other embodiments made out of suitable plastics material known in the art, however, such seals are not required as the materials are sufficient to provide a water-tight seal.

The invention claimed is:

1. A waste for an item of sanitary ware generating grey water, the waste comprising:
   (i) a generally cylindrical outer sleeve having:
      a) first and second outlets configured to discharge grey water, the first outlet being arranged to connect to a drainage system and the second outlet being arranged to connect to a recycling system; and
      b) a flange which is arranged in use to secure the waste to a rim of an aperture of an item of sanitary ware;
   the waste further comprising:
   (ii) a substantially cylindrical inner sleeve concentrically and rotatably arranged within the outer sleeve, the inner sleeve having a lid portion having at least one first inlet configured to admit grey water into the interior of the sleeve, the lid portion having a handle which in use can be gripped by a user to provide rotation of the inner sleeve within the outer sleeve between first, second and third positions, the inner sleeve further having at least one outlet aperture;
   wherein the inner sleeve is arranged with respect to the outer sleeve such that:
      in the first position the at least one outlet aperture aligns with the first outlet of the outer sleeve such that the inner sleeve connects the first inlet to the first outlet of the outer sleeve, whereby in use grey water from the item of sanitary ware is discharged via the interior of the inner sleeve into the drainage system,
      in the second position the at least one outlet aperture aligns with the second outlet of the outer sleeve such that the inner sleeve connects the first inlet to the second outlet of the outer sleeve, whereby in use grey water from the item of sanitary ware is discharged via the interior of the inner sleeve to the recycling system, and
      in the third position the at least one outlet aperture does not align with either the first outlet or the second outlet of the outer sleeve such that the inner sleeve does not connect the first inlet to either the first or second outlets, whereby in use the interior of the inner sleeve fills with water via the first inlet and once full the item of sanitary ware is then effectively plugged.

2. A waste as claimed in claim 1, further comprising tactile means arranged to identify each of the positions.

3. A waste as claimed in claim 1, wherein the second outlet is double ended.

4. A waste as claimed in claim 1, wherein the first outlet further comprises an integral trap.

5. An item of grey-water generating sanitary ware, comprising a waste as claimed in claim 1.

6. A waste according to claim 1, wherein the first outlet has means for connecting to an over-flow, the means for connection to an over-flow comprising a spigot arranged in use to be connected directly to an over-flow pipe.

\* \* \* \* \*